Dec. 10, 1957 R. J. STETZ ET AL 2,815,889
METERING DEVICE CONTROLLING DISCHARGE OF
FLUIDS FROM AEROSOL CONTAINERS
Filed July 28, 1955 2 Sheets-Sheet 1

INVENTORS:
ROBERT J. STETZ
CHARLES R. HILL
EDMUND ROGERS
BY Justin W. Macklin
ATTY

INVENTORS:
ROBERT J. STETZ
CHARLES R. HILL
EDMUND ROGERS

United States Patent Office 2,815,889
Patented Dec. 10, 1957

2,815,889

METERING DEVICE CONTROLLING DISCHARGE OF FLUIDS FROM AEROSOL CONTAINERS

Robert J. Stetz, Westlake, Charles R. Hill, Avon Lake, and Edmund Rogers, South Euclid, Ohio, assignors to The Engine Parts Manufacturing Company, Cleveland, Ohio, a corporation of Ohio Application July 28, 1955, Serial No. 524,924

6 Claims. (Cl. 222—189)

This invention relates to aerosol container dispensing of fluids such as perfume, cologne, toilet water, shaving soap, and other fluids of such nature that it is desirable to spray only a limited predetermined amount consequent upon the single opening of a valve.

Various obstacles and objections have heretofore precluded the successful and economical use of aerosol dispenser containers for metering the pressure propelled discharge of such liquids.

Accordingly, the essential object of the present invention is to provide an aerosol container in which the liquid gas propellant may be mixed with perfume, cologne, liquid shaving soaps, or any of many other liquids, and may be released in predetermined or measured amounts and for a short interval until the flow of liquid through the discharge passage exhausts an accumulated charge. Following each such metered discharge, a moment only is needed before a new charge subject to release is accumulated and may be sprayed by subsequent opening of the valve.

By the present invention, we are enabled to provide a unique, simple, and effective means for metering predetermined measured amounts of liquid subject to being released and sprayed consequent upon each single opening of the valve. The volume of this metered amount may range from a drop or less up to a substantial part, say one-tenth or more, of the contents of the container.

For illustration we refer to dispensing small amounts. Assuming a convenient container suitable for withstanding the desired liquid gas pressure in which the selected liquid is contained in a mixture, and that a suitable valve and spray orifice leads from within the container, the operation may be as follows:

The valve may be opened by pressure of one finger, and the resultant discharge in spray form can be that of a minute amount in a volume corresponding to a drop or more, and which would be discharged in half a second to a second following which the liquid would stop flowing. That is, the supply of available liquid for the spray resulting from that valve opening action would be exhausted. Upon releasing the valve, however, a new metered supply available for subsequent discharge may accumulate in a like short interval of controlled time, of a second or two, with the result that the needed amount adequate for the purpose may be released in a succession of two, three, or more release activations, and in a spray directed at the desired surface or zone, a preferred minimum amount only having been used. It follows that no undesirable surplus is applied.

The embodiment of our invention, illustrated in the accompanying drawings, includes a small aerosol container, such as may be used for perfume, cologne, or the like, a feeder or "syphon" tube leading to the bottom of the container, and thus to the bottom of the body of liquid, and upwardly to an opening closed by a valve which may be actuated by finger pressure. Within the tube is a metering element, in the nature of a porous plug, through which the liquid can flow under pressure only at a restricted rate. Above the plug and below the valve is a relatively small space or chamber in which a predetermined amount of liquid may accumulate at any one time and be released by opening the valve, but after which a time interval is necessary to accumulate sufficient liquid to again form a spray stream to be emitted from the exit orifice.

This metering plug must be tightly fitted into its tube and be firmly held in a predetermined position. It may constitute a porous substance of ceramic or other rigid material, or may be fiberous material such as felt, having the proper characteristics of fiber size and length. Its function is to permit a restricted or controlled rate of flow which has a relation to the pressure within the container, the space above the metering plug and the volume desired for the spray stream.

Figure 8:
Figure 9:
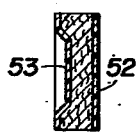
Figure 5:
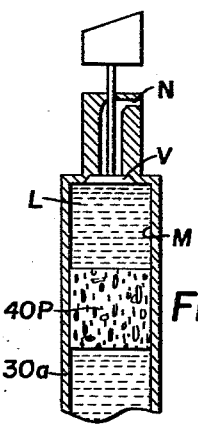
Figure 6:
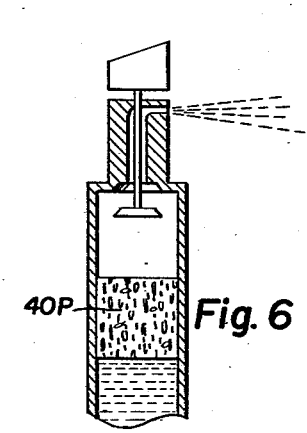
Figure 7:
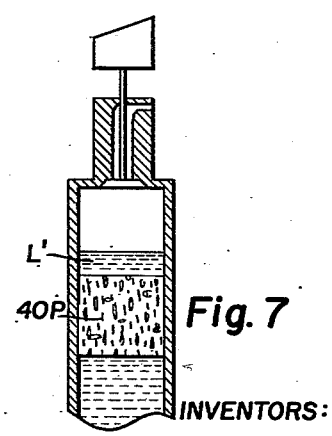

Figs. 5, 6, and 7 are diagrammatic views illustrating the action of the metering plug; Fig. 5 showing the accumulation of the metered fluid above the plug as a charge or slug of measured amount; and Fig. 6 being a similar diagrammatic view showing the valve open and the liquid charge being emptied from the metering chamber; while Fig. 7 is a similar diagrammatic view showing the valve closed and the beginning of an accumulation of a new charge above the metering plug;

Fig. 8 is an elevational detail of a modified form of plug of resilient fiber;

Fig. 9 shows this section of a sleeve containing the plug of Fig. 8; and

Figure 10:
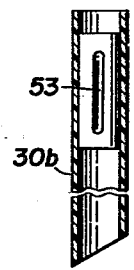

Fig. 10 shows such a sleeve contained plug mounted in the feeder tube.

Figure 1:
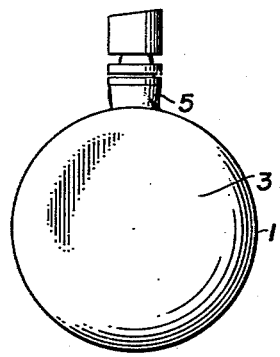
Fig. 1 is a side elevation of an illustrative small container such as may be used for perfumes and the like, showing the finger operated valve and spray nozzle and indicating the direction of the spray.
Figure 2:
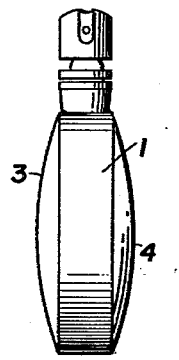
Fig. 2 is an edge elevation of the same.
Figure 3:
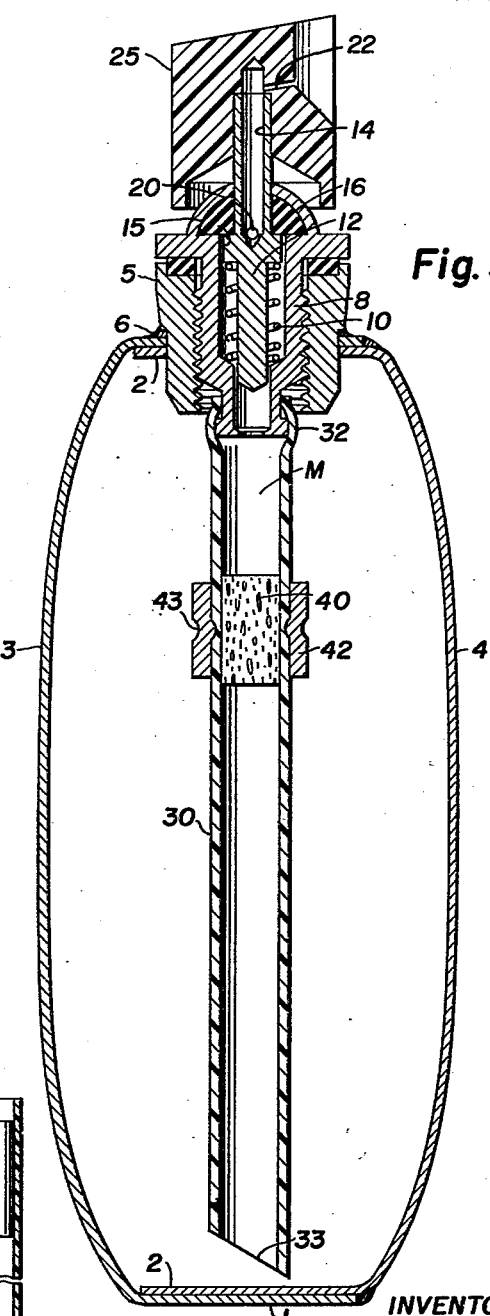
Fig. 3 is an enlarged transverse section through such a container and a suitable valve showing the feeder tube metering plug and valve controlled passages.
Figure 4:
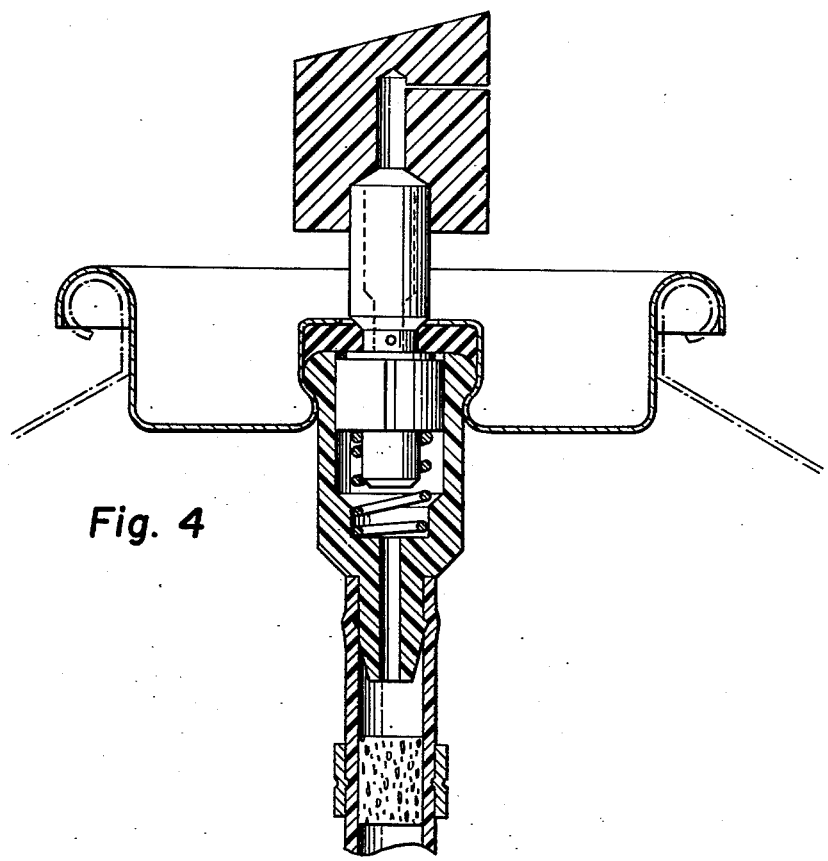
Fig. 4 is a similar view illustrating a different form of valve and mounting for attachment to an aerosol can of the type used for containing larger quantities of fluid to be sprayed.

Referring to the drawings, the container shown in Figs. 1, 2, and 3, which is of a shape and size comparable to a small face powder compact for convenience in carrying and handling, and wherefor it is particularly useful for perfumes, colognes, toilet water, or analogous liquids. It is shown as having a cylindrical narrow rim portion and slightly bulging sides comprising two parts having overlapping flanges 1 and 2 forming a cylindrical rim and convex side walls 3 and 4. Through the overlapping flanges, I form registering openings adapted to receive a valve support 5 which extends inwardly through the opening and may be soldered or otherwise sealed as at 6 to form a gas tight pressure-containing joint between the valve support and the container.

The valve support is internally threaded to receive threads of a valve body 8. A central passage through the valve body is formed of different diameters providing intermediately for space for a spring 10 acting on a valve stem 12 which in turn has an axial bore in its upper portion as at 14. An intermediate enlargement 15 forms a shoulder which may engage a resilient valve seat 16 through which the stem 12 slidably moves when it is depressed to open. An opening 20 permits communication from below the enlargement to the passage 14 and to a nozzle passage 22, the shoulder and lower end of the valve stem having sufficient clearance at either side thereof to permit fluid to pass along the same and to the opening 20, and thence to the nozzle passage 22.

As shown, a finger knob or the like 25 is fitted over the upper portion of the valve stem and is rigidly carried thereon, while a cavity in the lower portion affords clearance below the knob, over the valve seat enclosure 26, allowing the knob to be depressed to open the valve. As indicated, the structure of the valve may be of various forms, it being necessary to use a structure which may be cheap to manufacture and which may effectively close to permanently retain the liquid gas generated presssure within the container.

In such aerosol container structures, it is the practice to provide a feeder tube extending to what may become a bottom portion. Such a feeder tube, commonly called the "syphon" tube, is shown at 30 embracing and attached to a suitable enlargement at the inner portion of the valve body 8 as at 32, while at its lower end the usual slope or bevel 33 affords an inlet close to the adjacent bottom wall of the container while avoiding likelihood of closure by contact therewith.

The structure so far described, except for mechanical details making possible the embodiment of an aerosol atomizer in a small powder compact size container which is safe and convenient is, for the purpose of the present application, illustrative only of the combination of a container, manually opened valve and feeder tube leading thereto.

The objectives stated above of metering a predetermined small amount of liquid following each opening of the valve constitutes the novel and unique, simple and yet very effective device with which this present application is primarily concerned.

Again referring to the metering operation desired, as above indicated the structure hereinafter described will effect accumulation of a predetermined amount or charge of liquid above a rate of fluid-flow-control element, and which measured volume of liquid will be instantly and effectively sprayed upon the opening of the valve. This spraying requires only a fraction of a second to a few seconds at the most, depending upon the use, and the material is followed by a discontinuation of the spray when the charge of the metered fluid has been expelled.

The valve then is closed and a new charge or slug of metered fluid is accumulated in a like short period of a fraction of a second to a few seconds, and which may be discharged in the desired spray upon reopening the valve. Thus, each repeated full spray discharge of metered amounts may be followed by discontinuation of the spray. This obviously is apparent to the user and signals the need for closing the valve.

This operation may be repeated indefinitely at any one time of use, until the entire liquid contents of the container are discharged. The result, as indicated in the stated objects, is that the liquid is sprayed in repeated momentary discharges of metered amounts, and many more valve openings and spray uses are possible than were the flow to be free and uninterrupted as long as the valve is held open.

Referring to Fig. 3 and Figs. 5, 6, and 7, the feeder tube 30 is shown as having tightly fitted therein a porous flow controlling metering plug 40. Assuming that the feeder tube 30 is round, the plug 40, cylindrical and of a diameter such that it may be tightly but forcibly slid into the tube, and be positioned at the desired predetermined distance below the valve.

The metering plug, for many kinds of free-flowing fluids, is preferably in the nature of a ceramic, porous structure of a length preferably somewhat greater than the diameter of the tube, although its length may be several times that of the inside diameter of the tube, depending upon the conditions, as will hereinafter appear, of desired rate of refill for recharging the meter chamber.

In Fig. 3 the distance below the valve is shown to be approximately twice the diameter of the feeder tube to the top or discharge end of the metering plug 40, and it may be assumed that when the valve is opened, the space outside of the metering plug through the valve passages and spray orifice will be emptied of solid fluid charge. Upon closing of the valve, the passage below the valve member 16 and in the space between the valve and metering plug, indicated at M, will be quickly filled, or substantially filled, by flow of the liquid through the metering plug 40.

Still referring to Fig. 3, we have there shown a clamping ring 42 of metal or other material which may be slid over the tube 30 and may be permanently crimped inwardly as at 43, to assure gas and liquid-tight engagement of the tube with the metering plug.

Referring now to Figs. 5, 6, and 7, we have found that when the valve is closed, liquid will pass through the metering plug, designated 40P in these diagrammatic views, so that the chamber M between the plug and the valve, designated V, will be filled with the measured amount of liquid determined by the volume of the chamber. This volume, in turn, may be varied according to the position of the metering plug.

Assuming that the valve is opened as in Fig. 6, the pressure of gas below the metering plug (and liquid starting to pass therethrough) will effectively spray from the nozzle indicated at N in these Figs. 5, 6, and 7, until the metered amount L is exhausted.

When this occurs, continued passage of gas, carrying only a minimum of liquid in a mere vaporous gas stream, will indicate the spray charge is exhausted, whereupon, when the finger pressure on the valve is released and the valve is closed, the liquid instantly begins to accumulate as at L' as shown in Fig. 7.

As indicated above, if perfume or cologne is being used, a spray sufficient for one general area of the person will have continued for perhaps a second or a fraction thereof. The total of one, two or three minims or drops will have been released. A noticeable stoppage of the spray streams prompts release of the finger pressure, and by the time one moves the spray nozzle to another position, the chamber will have filled or substantially filled for a similar discharge.

Larger amounts and longer duration of spray may be used for colognes, toilet water, or for various other uses such as insecticide spraying of cloth, floors, walls, or the like. Under all circumstances, however, the definite metering action effects economical and efficient use of the liquid being sprayed.

Other forms of material for the metering plug may be more suitable for other liquids and have been found satisfactory for perfume or cologne, such as fine fibered wool felt, which may be held in position by contracting the tube tightening thereon, or by containing them in an inner container, as illustrated in Figs. 8 and 9.

Another use of this invention is that of metering shaving soap and discharging the same in a foaming, more solid stream, which requires only that the coarseness of the fibers and consequent porosity of the metering plug be selected as suitable for the soap.

Figs. 8, 9, and 10 are details showing the manner of holding a resilient fiberous plug, such as felt, within the feeder tube in which Fig. 8 shows the plug, the fiberous material 50 in cylindrical form held in a sleeve 52, preferably of thin metal, and which in turn is held in the feeder tube 30a, the position of the plug and its containing sleeve being maintained by indenting the wall of the feeder tube into an elongated notch indicated at 53.

Having thus described our invention, what we claim is:

1. An aerosol container having means functioning to repeatedly deliver metered amounts of liquid contents consequent upon repeated spray release activation, said means comprising a tube leading substantially to the bottom of the container, a valve assembly supporting the tube and having a passage leading to the exterior, finger pressure actuating means for opening the valve, a metering plug of porous material fitting tightly into the tube above the bottom of the container and at a predetermined distance from the valve, thereby forming a chamber within the tube between the plug and valve, the contents of the container including a liquified gas normally maintaining the liquid contents under pressure and tending to force the liquid through the porous plug, the resistance of the plug to the flow of liquid being such that a measurable interval is required to fill said chamber after each opening and closing of the valve.

2. An aerosol spraying device for metering pre-measured charges of liquid for repeated release and discharge of said charges, comprising in combination, a closed container, a valve having passages leading to the interior thereof, a tube extending inwardly from the valve substantially to the bottom of the container, a spray orifice and passages leading thereto from the valve, a porous element tightly fitted into the tube and of such composition and length as to measurably retard flow of liquid therethrough under internal pressure on the liquid, whereby upon each opening of the valve a charge accumulated between the plug and valve may be discharged, but the impeding action on the flow of material requiring a time interval to again fill the space of chamber between the plug and valve.

3. The device defined in claim 2 in which said plug is tightly fitted into the tube and means are provided for securing the plug in a predetermined position effecting tight embracement of the tube around the plug.

4. The combination defined in claim 2 in which the metering porous plug is formed of ceramic material and is of such length as to cause a measurable time interval when the valve is closed before said charge chamber may again be filled.

5. The device defined in claim 2 in which said metering plug is of fiberous material of a length substantially greater than its diameter and means are provided for securing it against longitudinal movement within the tube.

6. An aerosol container having a spring-closed valve with passages leading from the interior to the exterior of the container, means forming a chamber at the inner end of the passage through the valve, including a liquid flow impeding means permitting liquid to fill the chamber under pressure from the interior for thus accumulating a premeasured charge of liquid in the chamber to be discharged when the valve is opened, the nature of the flow impeding means being such that the valve must be closed for an interval to fill the charge chamber with liquid.

References Cited in the file of this patent

UNITED STATES PATENTS

| | | |
|---|---|---|
| 1,821,549 | Hornor | Sept. 1, 1931 |
| 2,120,297 | Reinecke | June 14, 1938 |
| 2,171,501 | Gebauer | Aug. 29, 1939 |
| 2,400,231 | Gebauer | May 14, 1946 |
| 2,681,252 | Tuttle | June 15, 1954 |